(12) United States Patent
Di Chele et al.

(10) Patent No.: US 11,585,905 B2
(45) Date of Patent: Feb. 21, 2023

(54) LASER SCANNER

(71) Applicant: Datalogic IP Tech S.r.l., Lippo di Calderara di Reno (IT)

(72) Inventors: Andrea Di Chele, Baranello (IT); Paolo Aprile, Zola Predosa (IT); Giacomo Rigoni, Bologna (IT); Luca Pattini, Bologna (IT); Nicola Alessi, Bologna (IT)

(73) Assignee: DATALOGIC IP TECH S.R.L., Calderara di Reno (IT)

( * ) Notice: Subject to any disclaimer, the term of this patent is extended or adjusted under 35 U.S.C. 154(b) by 1052 days.

(21) Appl. No.: 16/098,419

(22) PCT Filed: May 3, 2017

(86) PCT No.: PCT/IT2017/000094
§ 371 (c)(1),
(2) Date: Nov. 1, 2018

(87) PCT Pub. No.: WO2017/191665
PCT Pub. Date: Nov. 9, 2017

(65) Prior Publication Data
US 2020/0150243 A1    May 14, 2020

Related U.S. Application Data

(63) Continuation-in-part of application No. 15/145,532, filed on May 3, 2016, now Pat. No. 10,048,120, and (Continued)

(30) Foreign Application Priority Data
Oct. 6, 2016  (IT) .................. 102016000100444

(51) Int. Cl.
*G01S 7/00* (2006.01)
*G01S 7/481* (2006.01)
(Continued)

(52) U.S. Cl.
CPC .......... *G01S 7/4817* (2013.01); *G01S 7/4813* (2013.01); *G02B 26/105* (2013.01); *G01S 7/497* (2013.01)

(58) Field of Classification Search
USPC ................................................ 356/5.01, 4.01
See application file for complete search history.

(56) References Cited

U.S. PATENT DOCUMENTS 4,687,282 A   8/1987 Ferrante
4,699,447 A   10/1987 Howard
(Continued)

FOREIGN PATENT DOCUMENTS

CN   101916357 A   12/2010
CN   106324582 A   1/2017
(Continued)

OTHER PUBLICATIONS

Extended European Search Report, dated Aug. 25, 2017, for European Application No. 17169258.5-1812, 72 pages.
(Continued)

*Primary Examiner* — James R Hulka
(74) *Attorney, Agent, or Firm* — Foley & Lardner LLP (57) ABSTRACT

A laser scanner (10) including a housing (12) having a window (14), a light source (34) for emitting a light beam (32), the window (14) being transparent to the wavelength(s) of the light beam (32), a scanning mirror (30) rotatable about an axis of rotation (X) for deflection of the light beam (32) toward a scanning area (SC) so that the light beam (32) periodically sweeps at least one sweep surface, and for deflection of return light from objects or persons in the scanning area (SC) into a light collection path, a motor (24) for rotating the scanning mirror (30), a photodetector element (42) for generating an electric signal, arranged in said light collection path, wherein the motor (24), the light source
(Continued)

(34), and the photodetector element (42) are all housed within the housing (12) on a same side with respect to said at least one sweep surface.

22 Claims, 5 Drawing Sheets

Related U.S. Application Data a continuation-in-part of application No. 15/145,545, filed on May 3, 2016, now Pat. No. 9,964,437.

(51) Int. Cl.
*G02B 26/10* (2006.01)
*G01S 7/497* (2006.01)

(56) References Cited

U.S. PATENT DOCUMENTS

| | | | |
|---|---|---|---|
| 5,202,784 | A | 4/1993 | Reddersen |
| 5,337,189 | A | 8/1994 | Krawczyk et al. |
| 5,422,471 | A | 6/1995 | Plesko |
| 5,455,669 | A | 10/1995 | Wetteborn |
| 6,491,222 | B1 | 12/2002 | Dvorkis et al. |
| 6,717,170 | B2 | 4/2004 | Worner |
| 7,280,211 | B2 | 10/2007 | Horibe et al. |
| 7,880,865 | B2 | 2/2011 | Tanaka et al. |
| 7,965,384 | B2 | 6/2011 | Drinkard |
| 8,319,171 | B2 | 11/2012 | Kawabata |
| 8,330,095 | B2 | 12/2012 | Kawabata |
| 8,625,080 | B2 | 1/2014 | Heizmann et al. |
| 8,724,096 | B2 | 5/2014 | Gosch et al. |
| 8,902,409 | B2 | 12/2014 | Sigmund et al. |
| 9,316,724 | B2 | 4/2016 | Gehring et al. |
| 9,423,499 | B2 | 8/2016 | Hammes |
| 10,048,120 | B2 | 8/2018 | Corrain et al. |
| 2002/0143506 | A1 | 10/2002 | D'Aligny et al. |
| 2005/0205755 | A1 | 9/2005 | Walsh et al. |
| 2008/0316310 | A1 | 12/2008 | Braune et al. |
| 2009/0002678 | A1 | 1/2009 | Tanaka et al. |
| 2009/0086189 | A1 | 4/2009 | Drinkard |
| 2010/0198365 | A1 | 8/2010 | Kawabata et al. |
| 2011/0077814 | A1 | 3/2011 | Haberer |
| 2012/0026466 | A1 | 2/2012 | Zhou et al. |
| 2013/0003041 | A1 | 1/2013 | Sigmund et al. |
| 2013/0250302 | A1 | 9/2013 | Kramer |
| 2013/0256418 | A1 | 10/2013 | Havens et al. |
| 2014/0166866 | A1 | 6/2014 | Gehring et al. |
| 2015/0219763 | A1 | 8/2015 | Nubling |
| 2015/0378152 | A1* | 12/2015 | Kodani ............... G02B 7/1821 359/200.1 |

FOREIGN PATENT DOCUMENTS

| | | | |
|---|---|---|---|
| DE | 10326848 | A1 | 1/2005 |
| DE | 202009015194 | U1 | 3/2010 |
| DE | 102012102244 | A1 | 10/2012 |
| DE | 102012112987 | B3 | 12/2013 |
| DE | 202013101807 | U1 | 7/2014 |
| EP | 1 562 055 | A2 | 8/2005 |
| EP | 1562055 | A2 | 8/2005 |
| EP | 1617205 | A1 | 1/2006 |
| EP | 1617206 | A1 | 1/2006 |
| EP | 1666913 | A2 | 6/2006 |
| EP | 1965225 | A2 | 9/2008 |
| EP | 2237063 | A1 | 10/2010 |
| EP | 2375264 | B1 | 5/2012 |
| EP | 2447733 | A1 | 5/2012 |
| EP | 2378309 | B1 | 7/2012 |
| EP | 2541273 | B1 | 5/2013 |
| EP | 2624016 | A1 | 8/2013 |
| EP | 2950115 | A1 | 12/2015 |
| EP | 3267218 | A1 | 1/2018 |
| GB | 2 100 424 | A | 12/1982 |
| JP | 62254008 | A | 11/1987 |
| JP | S62-254008 | A | 11/1987 |
| JP | 2016012035 | A * | 1/2016 ............ G02B 26/12 |
| WO | 9722945 | A1 | 6/1997 |
| WO | 03087875 | A1 | 10/2003 |

OTHER PUBLICATIONS

International Search Report, dated Oct. 12, 2017, for International Application No. PCT/IT2017/000094, 12 pages.
Extended European Search Report, dated Oct. 23, 2017, for European Application No. 17169257.7-1812, 6 pages.
Extended European Search Report, dated Nov. 30, 2017, for European Application No. 17179849.9-1812, 8 pages.
Elmer, "The Optical Design of Reflectors," New York, NY, John Wiley & Sons, 1980, pp. 72-75.
Faetani et al., "Clutter Filter Configuration for Safety Laser Scanner," U.S. Appl. No. 15/203,531, filed Jul. 6, 2016, 38 pages.
Lorenzoni et al., "Laser Scanner With Reduced Internal Optical Reflection," U.S. Appl. No. 15/145,545, filed May 3, 2016, 30 pages.
Omron Corporation, "Safety Laser Scanner OS32C Series—User's Manual," Manual No. Z296-E1-10, Mar. 2015, 180 pages.
Zhao, "Practical Reflector Design and Calculation for General Illumination," Proceedings of SPIE 5942, Nonimaging Optics and Efficient Illumination Systems II, San Diego, CA, Jul. 31, 2005, 9 pages.
EP Patent Application No. 17 737 064.0, European Examination Report dated Feb. 18, 2022, 5 pgs.

* cited by examiner

FIG. 8

# LASER SCANNER

CROSS REFERENCE TO RELATED APPLICATIONS

This Application is the U.S. National Stage Application of PCT/IT2017/000094, filed May 3, 2017, which is a continuation-in-part of U.S. application Ser No. 15/145,532, filed May 3, 2016, now U.S. Pat. No. 10,048,120, issued Aug. 14, 2018, and a continuation-in-part of U.S. application Serial No. 15/145,545, filed May 3, 2016, now U.S. Pat. No. 9,964,437, issued May 8, 2018 and claims priority to and the benefit of IT102016000100444, filed Oct. 6, 2016, each of which is incorporated herein by reference in its entirety.

The present invention relates to a laser scanner and more in particular to a distance measurement and/or safety laser scanner.

Laser scanners are currently used in a number of applications for the detection of objects, wherein a collimated light beam generated by a laser source periodically moves or sweeps over an area to be scanned or monitored.

In the present description and the attached claims, term "light" is used broadly to also encompass invisible electromagnetic radiation.

The light beam may be moved by a scanning mirror which rotates (or in other embodiments not of concern herein by a deflection unit which oscillates) to direct light beams over the area. The light reflected or scattered back by an object toward the laser scanner in the same direction from where it was emitted by the laser scanner—also referred to as "remitted" or "re-emitted" in safety laser scanner technology—is collected and detected by a photodetector.

In the present description and in the attached claims, the term "object" is sometimes used broadly to also encompass persons.

Using the time of flight of pulses of light so reflected or scattered back by an object and the speed of light, the distance of the object may be determined. Using the angular position of the scanning mirror, the angular position of the object may also be determined. From the angular position and distance measurements, objects in the area may be detected in two-dimensional polar coordinates, for example. Furthermore, their contour or shape may be determined.

In addition to object measurement applications, laser scanners may also be used in safety applications for monitoring a source of danger, such as a machine. In such safety applications, a laser scanner may be positioned to monitor an area proximate the source of danger which should not be entered by personnel, for example. If a person or object enters the monitored area when the laser scanner is active, the laser scanner may take an appropriate protective measure. The monitored area may be further subdivided into a broader (warning) area where object detection triggers only a mitigating action (slowing down the machine or sounding an alarm), and a smaller area, closer to the source of danger, called safety area, where a complete elimination of any source of danger must be achieved, which typically means complete shutdown of any operating machine in such area.

The laser scanner and/or a computer connected thereto may also be programmed to tolerate or ignore some static or moving objects within the monitored (warning/safety) area having a specific position and/or shape.

U.S. Pat. No. 4,699,447 discloses an optical scanner apparatus particularly suited for use in a laser bar code reader that includes a series of mirrors mounted in a basket-like array about the optical beam axis. A mirror is mounted obliquely across the beam axis, directly on the path of the beam, to fold the beam generally radially outwardly toward the array of mirrors. In one embodiment the oblique first mirror is rotated about the beam axis, to reflect the beam forwardly, generally in the direction the beam axis is pointing. A plurality of scan lines, including non-parallel scan lines, are formed on a surface to be scanned. The mirrors can be oriented at desired angles to produce virtually any desired scan pattern. A central tubular member or spindle is hollow and within it are located some components of a laser, to shorten the length of the overall assembly into a more compact configuration.

More specifically the device of this document includes a hollow motor spindle, on the end of which is mounted the obliquely angled mirror. An appropriate opening is formed in the hollow motor spindle, in a position to permit the scanning beam to pass through so that it may strike each mirror of the basket-like array. The hollow motor spindle is mounted on bearings and within a tubular housing member, and an electric motor is positioned coaxially between the motor spindle and the housing member. The motor spindle serves as the armature of the motor. The light beam enters through a rear opening in the hollow motor spindle, passes through the motor spindle and reflects off the rotating obliquely angled mirror. The beam is deflected radially outwardly in a sweeping path, preferably in a plane normal to the optical axis of the input beam. In one embodiment, to obtain a very compact laser scanner assembly, a laser diode is mounted at the back end of the housing component of the scanner, and optical components for the laser diode's beam forming are positioned inside the rotational hollow motor spindle, and may be fixed to the spindle and thus rotational with respect to the diode.

However, the document fails to teach or suggest where a receiver of any reflected light would be arranged.

U.S. Pat. No. 5,337,189 discloses a scanning device for emitting a laser beam and receiving a return laser beam, for example in an optical instrument called a "lidar" ("Light Detection and Ranging") which is the equivalent of a radar in the optical wavelength range, wherein the rotational movement of the mirror is provided by a hollow tube integral with the mirror and traversed by the emission axis, and which cooperates with bearings and a drive motor, which includes, for example, a pinion cooperating with a ring gear encircling the tube and forming a rack; in an alternative embodiment, the movement is ensured by a hollow motor.

In none of the above documents, however, the light collection path passes through the rotary members; moreover, none of the documents discloses any reference system for the measurement.

Indeed, in order to increase the reliability of safety laser scanners, they are known to include a reference system for measuring a known distance, so as to determine a measurement error of the laser scanner that in turn allows for calibration of the laser scanner. In particular, such reference systems usually include one or more reference target(s) that is(are) also scanned during operation of the laser scanner. Using the time of flight of pulses of light reflected by the reference target(s) and the speed of light, a current distance of the reference target(s) may be calculated similarly to the object distance measurements. From the current distance and the known distance of the reference target(s), an offset can be determined, and used to calibrate the distance measurements taken. The offset may be due to several reasons or internal measurement errors, including e.g. the triggering time of the laser source, the response time of the photodetector element, the relative displacement of components, etc., that may also depend on temperature changes, ageing or contamination of the components etc.

U.S. Pat. No. 6,717,170 B2 discloses an optoelectronic apparatus for detecting objects in a monitored region comprising: a transmitter that emits transmission light that is guided into the monitored region, the emitted transmission light being in the form of a sequence of transmission light pulses; a diverting unit that periodically guides transmission light pulses into the monitored region; means for coupling out a portion of the light quantity of a transmission light pulse as a reference transmission light pulse so that for each diversion of a transmission light pulse by the diverting unit, a reference transmission light pulse is coupled out of the transmission light pulse; a receiver that receives reflected light including transmission light pulses reflected by an object in the monitored region and respective reference transmission light pulses which are guided by way of a reference path to the receiver; a housing having an exit window wherein the transmitter, the receiver and the diverting unit are situated in the housing so that the transmission light pulses diverted at the diverting unit are guided into the monitored region by way of the exit window; and wherein the coupling-out means is a reflection surface disposed at the exit window, the reflection surface reflecting a portion of the light quantity of the transmission light pulses as the reference transmission light pulse back to the receiver; and an evaluation unit connected to the transmitter and the receiver, said evaluation unit determining transit time of the reflected transmission light pulse, and transit time of the respective, reference transmission light pulse guided as a reference reflected light pulse to the receiver, wherein the transit-time difference is used to determine the distance of an object.

The apparatus of this document therefore allows a referencing of the distance measurement performed continuously for all of the transmission light pulses guided into the monitored region.

Moreover, the coupling-out of the reference transmission light pulse does not limit the usable monitored region.

The reference transmission light pulses are guided completely inside the housing.

However, in such a document the transmission light pulses are guided into the monitored region only for an angular range of 180°. Therefore a monitoring over 360° is not made possible.

Moreover, in this document the coupling-out means is a reflection surface disposed at the exit window. Thus the precision is affected by stains over the exit window that may behave as the reflection surface itself.

U.S. Pat. No. 9,423,499 B2 which is considered the closest prior art faces the problem of providing a laser scanner that may be used both as a distance measurer and as a safety laser scanner, and provides such a laser scanner that uses an internal reference target to check the error-free function of the distance measurement and its unimpaired sensitivity, and to determine and correct a current distance offset caused by temperature-dependent internal signal transit time fluctuations. To allegedly meet those aims, this document discloses a laser scanner comprising a light transmitter for transmitting a light signal into a monitored zone, a light receiver for generating a received signal from the light signal remitted by objects in the monitored zone, a test light transmitter for generating a test light signal, a movable deflection unit for the periodic deflection of the light signal to scan the monitored zone in the course of the movement, and an evaluation unit for detecting the objects with reference to the received signal and for testing the signal path from the transmission of the light signal up to the detection of the objects, wherein the evaluation unit is configured also to detect objects in angular positions of the deflection unit in which the signal path is tested, and wherein the test light transmitter is orientated such that the test light signal within the laser scanner moves directly or via a scattering object within the housing or via the deflection unit to the light receiver.

This document however teaches that the light transmitter and the test light transmitter use different light sources, so that the measurement pulses and the test pulses are advantageously decoupled time-wise or spectrally decoupled so that they do not superimpose in the received signal.

The Applicant observes however that the use of different sources entails different ageing and different delays within the measurement path and the test path, so that the error in the test signal is not necessarily precisely indicative of the error in the measurement signal. Moreover, though this document states that the wires crossing the window do not impair the detection over 360°, they actually do represent a hindrance that should be at least taken into account by the processing unit.

In other safety laser scanners, a target for obtaining a reference signal is sometimes arranged onto a supporting arm of the scanning mirror, which is a dead zone wherein safety scanning and measurement cannot take place.

The technical problem at the basis of the invention is that of providing a laser scanner that is capable of effectively scan over 360°, and which is particularly compact.

The laser scanner should also allow detecting objects in an angular position of the scanning mirror in which a reference measure is taken.

In an aspect the invention relates to a laser scanner including:
  a housing having a window,
  a light source for emitting a light beam, the window being transparent to the wavelength(s) of the light beam,
  a scanning mirror rotatable about an axis of rotation for deflection of the light beam toward a scanning area so that the light beam periodically sweeps at least one sweep surface, and for deflection of return light from objects or persons in the scanning area into a light collection path,
  a motor for rotating the scanning mirror,
  a photodetector element for generating an electric signal, arranged in said light collection path,
wherein the motor, the light source, and the photodetector element are all housed within the housing on a same side with respect to said at least one sweep surface.

Preferably the at least one sweep surface is at least one sweep plane and the motor, the light source, and the photodetector element are all housed within the housing on a same half-plane with respect to said at least one sweep plane.

According to the above configuration, there is no component intersecting the sweep surface or plane, and therefore unimpeded scanning over 360° may be obtained.

Moreover, the above configuration allows the electrical power and signal connection of the laser scanner to be simplified.

Furthermore, advantageously, the above configuration allows all components apart from the scanning mirror to be covered by an opaque portion of the housing, and only the scanning mirror to be covered by a transparent cap providing the transparent window. This adds to a smooth appearance of the apparatus, but more importantly allows the transparent cap to be easily removed for cleaning and replaced, without exposing dangerous, hot and/or delicate parts such as the light source and/or the motor.

Preferably said light source includes a laser light source, more preferably a laser diode.

Preferably said light beam carries a light signal in the form of a sequence of transmission light pulses, preferably short pulses, e.g. a few nanosecond pulses.

The laser scanner preferably further includes an evaluation unit for detecting objects and for measuring a distance of the objects based on a time of flight of the transmission light pulses from the light source to the photodetector element.

Preferably the scanning mirror is arranged to receive the light signal generally along the rotation axis and redirect it generally radially outwardly while sweeping it in a circular path.

Preferably said at least one sweep surface is a plane orthogonal to a length of an emission path of said light beam from the light source to the scanning mirror.

More preferably the scanning mirror is tilted by 45° with respect to the axis of rotation and the at least one sweep surface is a plane orthogonal to the axis of rotation.

In other embodiments, the scanning mirror forms a different angle with the rotation axis, and the sweep surface is a conus having a desired vertex angle, so that the scanning beam may e.g. be generically oriented towards a floor or a ceiling of a room.

Preferably said laser scanner further includes emission optics upstream of said scanning mirror in the emission path of said light beam from the laser source to the scanning mirror.

More preferably the emission optics includes at least one bending or folding mirror or prism.

Preferably, moreover, the scanning mirror is arranged to deflect the return light along the rotation axis.

Preferably the laser scanner further includes light collection optics in the light collection path, suitably dimensioned and positioned for collecting the light signal remitted by objects or persons in the scanning area and reflected back by the scanning mirror, and for directing it onto the photodetector element.

Preferably the emission optics, specifically the at least one bending mirror or prism, is arranged closer to the scanning mirror than the photodetector element, more preferably also closer to the scanning mirror than the light collection optics.

Although with such a configuration a part of the collected light is lost because the bending mirror is a hindrance, the lost part is overall neglectable.

The light collection optics may comprise a collecting mirror.

The collecting mirror is preferably an aspherical mirror.

The photodetector element is preferably arranged at the focus distance of the collecting mirror.

The light collection optics may, additionally or alternatively, comprise at least one wavelength selective element, such as a dichroic filter.

The light collection optics may, additionally or alternatively, comprise an objective including at least one focusing lens.

The photodetector element and the collecting mirror are preferably coaxial with the rotation axis.

The photodetector element is preferably arranged closer to the scanning mirror along the rotation axis than the collecting mirror, and has its detecting face facing the collecting mirror.

This has also the advantage that the photodetector element is less subject to direct lighting by ambient light and/or by the laser beam along the emission path.

Alternatively or additionally, the light collection optics may comprise at least one bending mirror or prism, the photodetector element being not coaxial with the rotation axis.

Preferably the light collection optics comprises a bending or folding mirror made on a face opposite the bending or folding mirror of the emission optics.

Preferably the light collection optics and the emission optics share a prism element.

Preferably the scanning mirror co-rotates with a rotary tubular element part of or driven into rotation by the motor, the rotary tubular element having a light transmissive radially central portion.

In the present description and attached claims, under "co-rotate" it is meant that the two components rotate as if they were one piece as far as direction of rotation and angular position over time are concerned, though there might be a gear reduction or increasing mechanism in between to change the rotating speed.

Preferably at least a portion of said light collection path passes through the light transmissive radially central portion of the rotary tubular element.

Preferably, moreover, at least a portion of the emission path from the light source to the scanning mirror passes through the light transmissive radially central portion of the rotary tubular element.

Preferably the light transmissive radially central portion of the rotary tubular element comprises a hole and/or a transparent plate.

More preferably the scanning mirror is supported at a peripheral sector of the rotary tubular element.

Preferably the rotary tubular element is one piece with the scanning mirror.

More preferably, the rotary tubular element including the possible transparent plate and the scanning mirror are formed as one piece in a transparent material, and the scanning mirror comprises a reflecting coating.

More preferably the rotary tubular element is a rotor of the motor, being supported to the housing through at least one bearing, coaxially inner with respect to a stator of the motor.

In this case, the rotary tubular element preferably bears magnetic elements.

Alternatively, the rotary tubular element is driven into rotation by a rotor of the motor through a motion transmission coupling.

In an embodiment, the motion transmission coupling comprises an external toothed member of the rotary tubular element meshing with an external toothed member of the rotor.

In an embodiment, the motion transmission coupling comprises an internal toothing of the rotary tubular element, preferably of a flange thereof, meshing with an external toothing of the rotor.

In an embodiment, the motion transmission coupling comprises an external toothing of the rotary tubular element and an external toothing of the rotor, and a toothed belt extending thereabout.

Preferably the housing comprises an opaque portion and a transparent cap defining the transparent window, the transparent cap housing the scanning mirror and the opaque portion housing all the remaining components.

It is understood that the scanning mirror need not be totally housed within the transparent cap, rather it may protrude in the opaque portion of the housing, and vice versa the remaining components need not be totally housed within the opaque portion of the housing, rather they may protrude in the transparent cap.

The opaque portion and the transparent cap are preferably separated at a plane parallel to the sweep plane.

Preferably the opaque portion and the transparent cap are separated at a plane defined by the transparent plate of the rotary tubular element.

Preferably, the laser scanner further comprises a reference subsystem comprising a reference light source for emitting a reference light beam over a reference emission path, at least one reference target that when illuminated by the reference light beam returns reference return light over a reference light collection path, and a reference photodetector element for generating a reference electric signal from the reference return light, wherein the at least one reference target is different from but co-rotates with the scanning mirror, so as to be periodically illuminated by the reference light beam.

In such a way, a reference light path that is distinct from the path of the scanning light is formed, thus limiting the interference of the reference light signal with the measurement light signal.

The laser scanner may thus reliably detect objects also in angular positions of the scanning mirror in which the reference measure is taken.

Moreover, the rotating reference target(s) may advantageously be used to infer an angular position and/or speed of the scanning mirror they co-rotate with, and thus be used as an encoder.

An encoder distinct from the rotating reference target(s) may however also be provided for, alternatively or additionally thereto.

Preferably said reference light source is said light source and said reference light beam is a reference portion of the light beam, even more preferably is a non-central portion of the light beam, namely a portion that is offset with respect to an axis of the light beam.

Preferably said reference light beam carries a reference light signal in the form of a sequence of reference transmission light pulses.

Preferably the evaluation unit is further configured to measure a reference distance based on a time of flight of the reference transmission light pulses from the reference light source to the reference photodetector element, and to adjust a measured distance of objects based on the measured reference distance, specifically based on a difference between the measured reference distance and the known reference distance. The known reference distance may, e.g., be measured with any distance meter.

Preferably the reference system further comprises a reference emission optics arranged in the reference emission path.

More preferably said reference emission optics comprises a static reference deflecting mirror or prism.

Even more preferably, said static reference deflecting mirror or prism is formed as one piece with a bending mirror or prism of said emission optics.

Preferably said reference photodetector element is said photodetector element.

Alternatively or additionally to the reference emission optics, the laser scanner may further comprise a reference light collection optics arranged in the reference light collection path.

Preferably said reference light collection optics comprises at least part of said light collection optics.

More preferably said reference light collection optics comprises a second static reference deflecting mirror or prism.

Even more preferably, said second static reference deflecting mirror is formed as one piece with said collecting mirror.

Preferably said reference emission path is not coinciding with the emission path from said light source to said scanning mirror.

Preferably said reference light collection path is not coinciding with said light collection path.

Preferably said scanning mirror is not involved in any of the reference emission path and the reference light collection path.

Preferably said static reference deflecting mirror or prism deflects a non-central portion of said light beam toward such a position as to periodically strike said at least one reference target during co-rotation with the scanning mirror.

Preferably said at least one reference target is radially external to the light collection path from the scanning mirror, so as not to hinder the return light and to limit interference with the return light.

Preferably said at least one reference target has at least one respective predefined "remittance".

When the reference target extends all about the rotation axis of the scanning mirror, then it is possible to have a reference signal for the entire 360° range of scanning.

More preferably, said at least one reference target comprises more than one reference target, the remittance of the reference targets and/or their spacing about the rotation axis encoding an angular position of the scanning mirror and/or an angular speed of the scanning mirror.

E.g. there may be 360 reference targets of alternate high and low remittance, such as black and white targets, evenly distributed so as to encode the angular position with a one-degree precision.

Preferably each of said at least one reference target extends along a sector of a radially inner surface of the rotary tubular element co-rotating with the scanning mirror.

Each of said at least one reference target may comprise a sector of a revolution surface which generating line is inclined with respect to the rotation axis, or may comprise a flat reflecting surface inclined with respect to the rotation axis.

Alternatively, each of said at least one reference target may be a coloured or textured or properly finished sector of a radially inner surface of the rotary tubular element co-rotating with the scanning mirror, such as a rib or a groove or a pattern of ribs and/or grooves.

The above feature of a reference target(s) different from but co-rotating with the scanning mirror is deemed to be inventive per se, irrespectively of the provision according to the first aspect of the invention, of the spatial location of the motor, the light source, and the photodetector with respect to the sweep surface.

Thus, in another aspect, the invention relates to a laser scanner including:
 a housing having a window,
 a light source for emitting a light beam, the window being transparent to the wavelength(s) of the light beam,
 a scanning mirror rotatable about an axis of rotation for deflection of the light beam toward a scanning area so that the light beam periodically sweeps at least one sweep surface, and for deflection of return light from objects or persons in the scanning area into a light collection path,
 a motor for rotating the scanning mirror, a photodetector element for generating an electric signal, arranged in said light collection path, and a reference subsystem comprising a reference light source for emitting a reference light beam over a reference emission path, at least one reference target that when illuminated by the reference light beam returns reference return light over a reference light collection path, and a reference photodetector element for generating a reference electric signal from the reference return light, wherein the at least one reference target is different from but co-rotates with the scanning mirror, so as to be periodically illuminated by the reference light beam.

Such a laser scanner has a particularly advantageous reference (sub)system.

Preferred embodiments of a laser scanner according to this aspect of the invention comprise one or more of the features disclosed above.

Further features and advantages of the present invention will become clearer from the following detailed description of some preferred embodiments thereof, made with reference to the attached drawings. The drawings are not necessarily drawn to scale. The different features in the single configurations can be combined with each other as desired. In such drawings.

Figure 1:
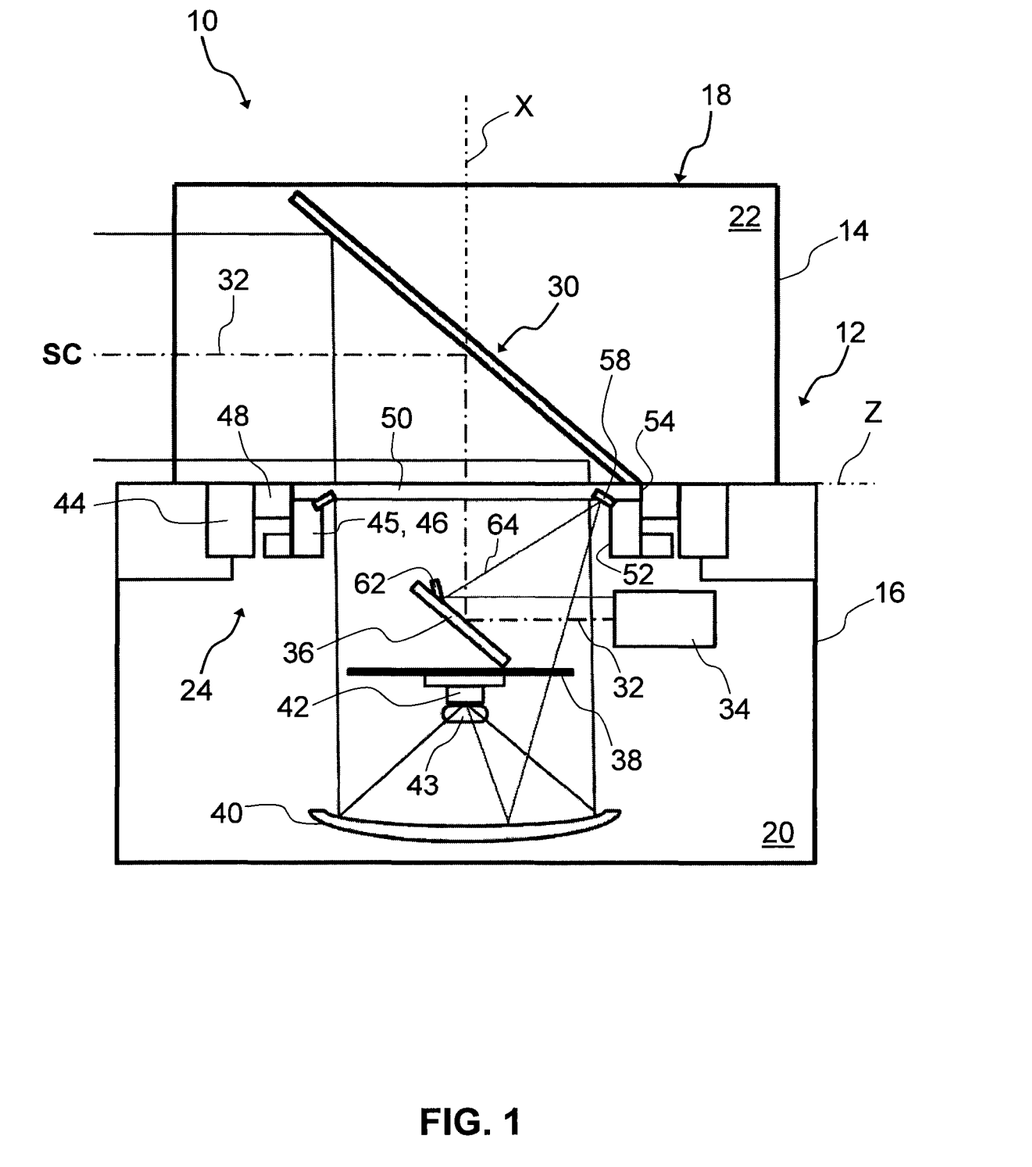
FIG. 1 shows a laser scanner according to a first embodiment of the invention.

FIG. 1 shows a laser scanner 10 according to a first embodiment of the invention. The laser scanner 10 includes a housing 12 having a transparent window 14 for entry and exit of light according to a selected wavelength(s).

The housing 12 includes a first housing portion 16, lowermost in the figure, and a second housing portion 18, uppermost in the figure. Each of the first housing portion 16 and the second housing portion 18 includes a respective interior chamber 20, 22 for housing one or more components of the laser scanner 10 therein.

In particular, the first housing portion 16 is preferably in the form of a basement and houses a rotary electric motor 24, components of a light emission or transmission subsystem, and components of a light receiving subsystem.

The first housing portion 16 is made of a suitable material, preferably such as to be generally opaque.

The second housing portion 18 is preferably in the form of a transparent cap forming the transparent window 14, and encloses a scanning mirror 30 which is rotatable around a rotation axis X by means of the electric motor 24. The motor 24 is operatively coupled to the scanning mirror 30 as better disclosed hereinbelow, and in particular drives the scanning mirror 30 in a continuous and uniform rotation, namely with a continuous and smooth, oscillation-free movement, about the rotation axis X.

As will be better disclosed hereinafter, a light beam 32 emitted by the light emission subsystem is deflected by the scanning mirror 30 outwards of the housing 12 through the transparent window 14, towards a scanning area SC; return light from objects in the scanning area SC enters the housing 12 through the transparent window 14, and is deflected by the scanning mirror 30 towards the light receiving subsystem.

The scanning mirror 30 is preferably tilted at 45° with respect to the rotation axis X, as shown.

The light emission subsystem comprises a light source 34, in particular a laser light source, that emits collimated emission light beam 32. Preferably, the emission light beam 32 is in the infrared spectrum.

Along its transmission path shown in chain dotted line, the light beam 32 eventually impinges on the scanning mirror 30, preferably along the direction of rotation axis X as shown, and is reflected thereby so as to be emitted, preferably in a radial direction as shown, outwardly of the transparent window 14.

The light beam 32 exits the housing 12 at an angular position (to the left in FIG. 1) which is dictated by and corresponds to the current angular position of the scanning mirror 30; accordingly, as the scanning mirror 30 rotates, the light beam 32 periodically sweeps a sweep plane orthogonal to the rotation axis X. The angular position of the scanning mirror 30 and therefore of the sweeping light beam 32 may be detected by a suitable detector (encoder). A detector may be provided in the electric motor 24 in a manner known per se; however, an advantageous embodiment of an encoder will be described hereinbelow.

Preferably, upstream of the scanning mirror 30, a bending mirror 36 is provided for in the emission subsystem, which deflects the light beam 32 emitted by the light source 34 and directs it toward the scanning mirror 30 so that the light source 34 may be arranged offset with respect to rotation axis X, and need not emit along the rotation axis X. The bending mirror 36, preferably and as shown, forms an angle of 45° with the rotation axis X, so that the light source 34 preferably emits the light beam 32 in a direction orthogonal to the rotation axis X, towards the rotation axis X itself.

The light that enters the housing 12 through the windows 14, which in particular is light that is back-reflected by any object or person present in the scanning area SC, is reflected or deflected by the scanning mirror 30 in a direction generally parallel to the rotation axis X, into a light collection path defined by the receiving subsystem. The return light and the light collection path are shown in solid lines in FIG. 1.

The receiving subsystem comprises an optional wavelength selective element or briefly filter 38, a collecting element 40 of such deflected return light, and a photodetector element 42, onto which the collected light is directed and which converts the collected light into an electrical signal proportional to its intensity over time.

An objective 43 comprising at least one focusing lens is preferably also provided upstream of the photodetector element 42.

The filter 38 is preferably a dichroic filter.

The photodetector element 42 may for example be an avalanche photodiode (APD) 42.

In the embodiment of FIG. 1, the collecting element 40 is an aspherical mirror 40 and the photodiode 42 is arranged at the focus distance of the aspherical mirror 40. The photodiode 42 is preferably closer to the aspherical mirror 40 than the bending mirror 36 of the emission subsystem.

It is noted that the motor 24, the light source 34, the optional filter 38, the aspherical mirror 40, the photodetector element 42, the optional objective 43, and the bending mirror 36 of the emission subsystem are all on the same side with respect to the sweep plane, and also with respect to a separation plane Z between the first and second housing portions 16, 18. Furthermore, the motor 24, the light source 34, the optional filter 38, the aspherical mirror 40, the photodetector element 42, the optional objective 43, and the bending mirror 36 are all on the side opposite to the scanning mirror 30 with respect to the separation plane Z.

In this embodiment, the bending mirror 36 of the emission subsystem, the photodetector element 42, the optional filter 38 and the optional objective 43 as well as their supporting elements (not shown) partly mask the return light that may be collected by the collecting element or aspherical mirror 40; however it will be understood that all the above components will be small and thin enough so that the effective loss incurred by the collecting mirror 40 is neglectable.

In the embodiment shown in FIG. 1, the electric motor 24 comprises a stator 44 fixedly coupled to the first housing portion 16 and a rotor 45 in the form of a rotary tubular element 46 supported to the housing 12 through a bearing 48 (or more than one bearing), coaxially inner with respect to the stator 44. The rotary tubular element 46 bears magnetic elements (not shown) that cooperate with electric windings of the stator 44.

The tubular element 46 is preferably, but not necessarily, provided with a circular transparent plate 50 that covers the radially inner or central region of the rotary tubular element 46, at one of its ends (the uppermost in FIG. 1). The transparent plate 50 protects the emission and receiving subsystems from dirt, and also contributes to a neat appearance of the laser scanner 10.

The end portion of the emission path and the initial portion of the light collection path, that as shown and said are aligned with the rotation axis X, pass through the rotary tubular element 46 and through the transparent plate 50, if provided for. More in particular, the transparent plate 50 and the central hole 52 of the rotary tubular element 46 are essentially as large as the footprint of the scanning mirror 30, so as not to hinder the light collection path.

The scanning mirror 30 is preferably formed as one piece with the rotary tubular element 46. Preferably, they are made in a transparent material, wherein the scanning mirror 30 comprises a reflecting coating.

More preferably, the scanning mirror 30 is fixed to and supported at a peripheral sector 54 of the rotary tubular element 46.

A reference target 58 in the form of a frustoconic reflecting surface is arranged or formed at the inner surface of the central hole 52 of the rotary tubular element 46 so as to co-rotate with the scanning mirror 30. The reference target 58 is preferably radially external with respect to the light collection path.

Moreover, a static reference deflection surface or mirror 62 is formed on the bending mirror 36 of the light emission path. The static reference deflecting mirror 62 is arranged and oriented with respect to the rotation axis X so as to deflect a non-central portion of the emission light beam 32 toward said reference target 58, as a reference light beam 64. In turn, the vertex angle of the frustoconic reference target 58 is suitably oriented with respect to the rotation axis X so as to deflect the reference light beam 64 towards the collecting element 40 of the receiving subsystem (possibly passing through the filter 38 as shown), with a proper angle so that it eventually strikes the photodetector element 42.

Because the length of the reference path travelled by the reference light beam 64 from the light source 34 to the photodetector element 42, as determined by the static reference deflecting mirror 62 and the reference target 58, is fixed and known (e.g. measurable by a suitable distance meter), such a length provides, throughout 360°, a reference distance that may be used to calibrate the distance measurement made along the (main) emission path and light collection path.

Moreover, as thoroughly discussed in the introductory portion of the present disclosure, to which reference shall be made, the reference target 58 may also advantageously embody or be part of an encoder of the angular position and/or speed of the rotary tubular element 46 and thus of the scanning mirror 30. To this aim, the reference target 58 will have one or more different remittance values at one or more angular positions that are spaced apart along the circumferential direction according to a known pattern.

The different remittance values may be provided e.g. by a different surface finishing and/or by a different colour of the reference target 58 or of a portion(s) thereof.

Instead of a frustoconic reflecting surface, it is possible to use, as said at least one reference target 58, one or more sectors of such a surface, or one or more flat reflecting surfaces circumferentially distributed, that are periodically struck by the reference light beam after deflection by the static reference deflecting mirror 62 during co-rotation of the rotary tubular element 46 with the scanning mirror 30. In this case, the reference length will still be provided over 360° though at discrete intervals.

It is noted that the reference emission path is not coinciding with the emission path from the light source 34 to the scanning mirror 30, and that the reference light collection path is not coinciding with the light collection path.

Moreover, the scanning mirror 30 is not involved in any of the reference emission path and the reference light collection path.

The operation of the laser scanner 10 is as follows.

The collimated light beam 32 emitted by the light source 34 is in the form of short (e.g. a few nanoseconds) pulses, which are emitted at each angular position among a plurality of angular positions spaced around 360°, preferably evenly spaced around 360°, such as at each degree or multiple or submultiple of degree. Each laser pulse follows the emission path through the bending mirror 36 and the transparent plate 50 when provided for, is deflected by the scanning mirror 30, and is output along a radial direction in the sweep plane across the transparent window 14.

The incoming light is collected from the transparent window 14, is deflected by the scanning mirror 30, follows the light collection path through the optional filter 38, the collecting mirror 40, the optional objective 43, and is converted by the photodetector element 42 into an electrical signal. The electrical signal is searched for a pulse representing the returned light pulse. The time of flight (TOF) of individual laser light pulses from their transmission until their reception after reflection by the object in the scanning area SC may be determined, which allows for calculation of the distance of the object that "remitted" (i.e. reflected or diffused back) the light pulse from the laser scanner 10, based on the known speed of light. This evaluation may be performed by a controller (not shown) which is operatively coupled to the light source 34, the photodetector element 42, the electric motor 24, and/or any angular position detector of the electric motor 24, advantageously an encoder exploiting the reference target(s) 58.

A similar distance measurement may be undertaken for light traveling along the reference path defined by the reference subsystem components described above (the light source 34, the static reference deflecting mirror 62, the reference target 58, the optional filter 38, the collecting mirror 40 and the optional objective 43) and striking the photodetector element 42, if such a reference subsystem is provided for, so as to obtain a reference distance that may be used to calibrate and/or correct measurement errors in a manner known per se and discussed in the introductory portion of the present disclosure.

If an object or person is accordingly detected to be in a safety area of the scanning area SC, in virtue of its angular position and/or in virtue of its distance, then an alarm signal is issued at an OSSD (Output Signal Switching Device) exit of the laser scanner. The alarm signal may be used e.g. to turn off a robot or machinery under surveillance by the safety laser scanner 10, either directly connected thereto or through the intermediation of a computer or, less preferably, a human being. Audible and/or visible alarms may also be turned on. Other measures may be taken if the object or person is detected to be in the warning area of the scanning area SC.

As an alternative or in addition thereto, by combining the various distance measurements as the angular position of the scanning mirror 30 changes, a contour of an object may be determined.

The distance and thus shape information of a detected object may also be used to implement a distinguishing feature of e.g. small objects such as chips from larger objects such as a leg or an arm of an operator, and to avoid issuing an alarm in the former case. Moreover, objects having known shapes can be recognised and ignored even when in the warning area or in the safety area, such as other robots or machinery. Furthermore, by suitably combining information over time, any movement of an object may also be inferred from the positional change of the object while the light beam 32 turns in the sweep plane, and from one turn of the light beam 32 over 360° to the next ones.

One application of the safety laser scanner 10 may be in a fixed station, such as atop of a doorway, with the axis of rotation X being arranged horizontally and orthogonal to the plane defined by the doorway. The sweep plane may then coincide with the plane defined by the doorway, or be slightly inside the room parallel thereto, so as to monitor entrance of human beings inside a room. In other applications, the sweep plane may be arranged horizontally or also tilted with respect to the floor.

The safety laser scanner 10 may also be used on board an Automated Guided Vehicle (AGV).

Although the sweep plane is stationary, one or more other laser scanners 10 may be used, having their sweep planes parallel to that of a first laser scanner 10, and/or one or more other laser scanners 10 having their sweep planes orthogonal to that of the first laser scanner 10 in order to obtain a sort of three-dimensional measurement and/or safety monitoring.

Figure 2:
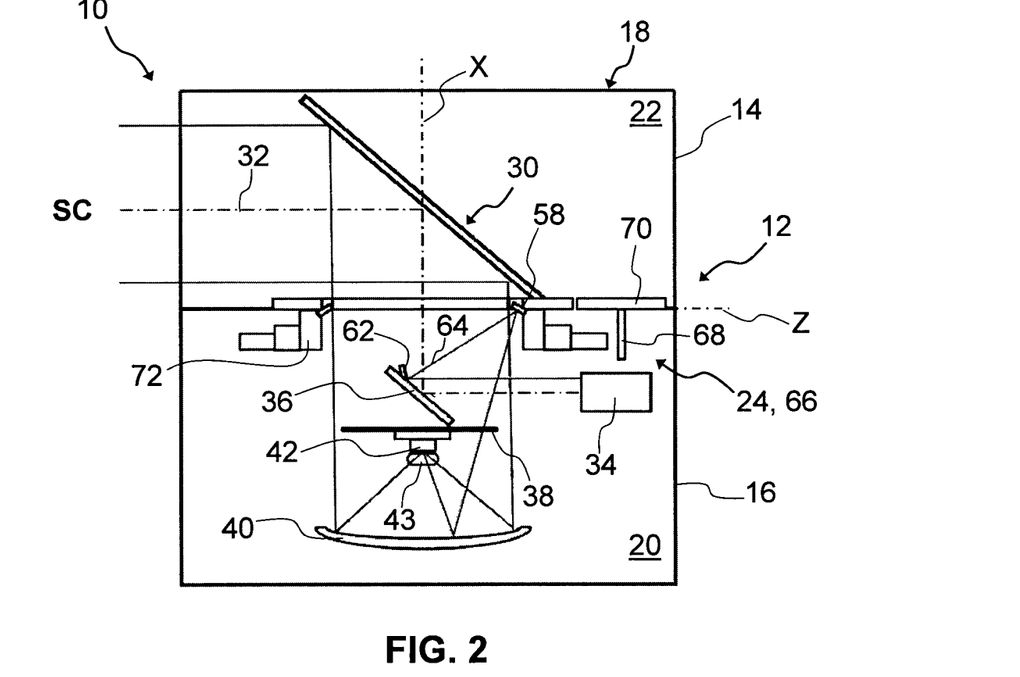
FIGS. 2-8 show a laser scanner according to further embodiments of the invention.
Figure 3:
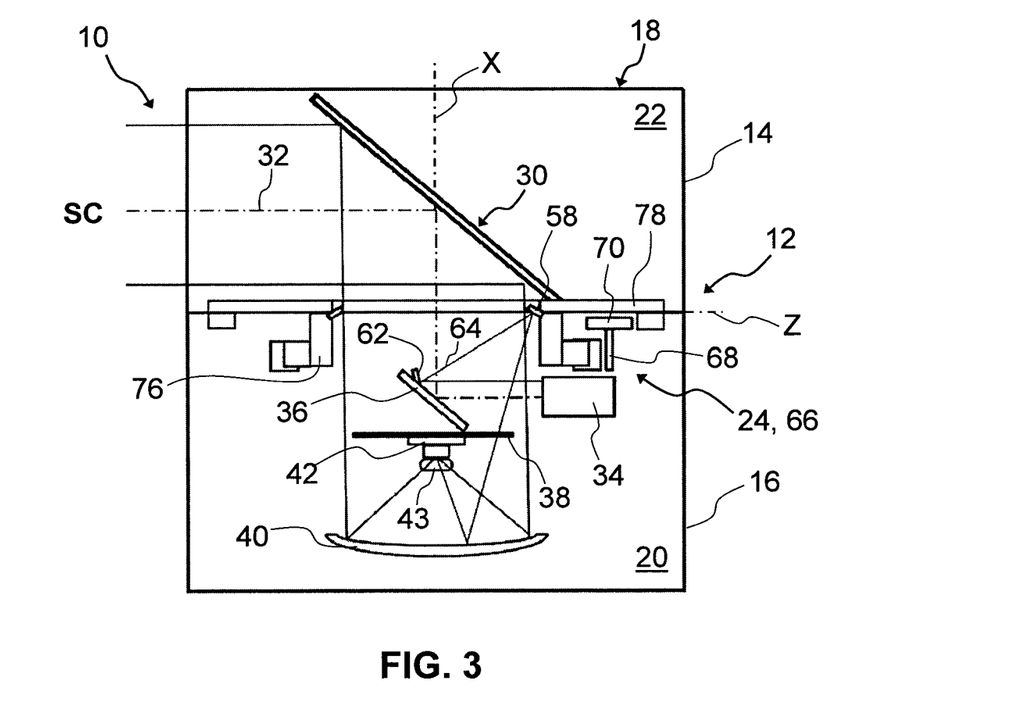
Figure 4:
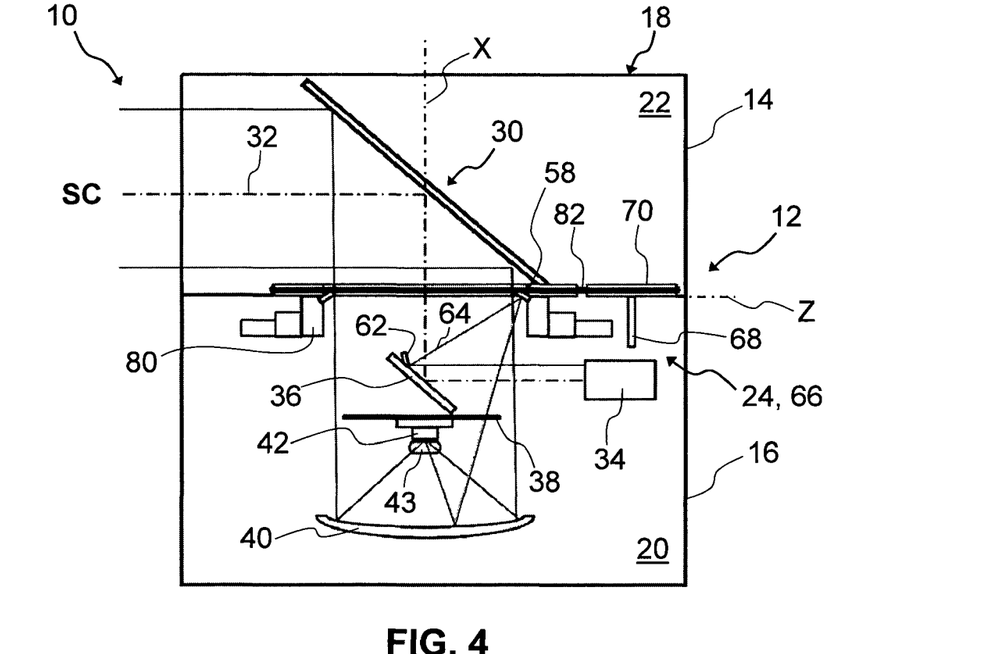

FIGS. 2-4 show further exemplary embodiments of a laser scanner 10 according to the invention, wherein a rotary tubular element, respectively 72, 76, 80 that co-rotates with the scanning mirror 30, similar to the rotary tubular element 46, does not form a rotor of the electric motor 24. These embodiments will be described hereinafter only in what differs from the previous embodiment illustrated in FIG. 1. In the embodiments shown in FIGS. 2-4 the rotor 66 of the electric motor 24 is separate and distinct from the scanning mirror 30. In particular, the rotor 66 of the electric motor 24 comprises an output shaft 68, supporting a toothed wheel 70 configured to transfer rotary motion to the rotary tubular element, respectively 72, 76, 80; in particular, the toothed wheel 70 is mounted on and preferably integral with the output shaft 68 of the electric motor 24 or of a gear reduction mechanism coupled thereto.

In the embodiment shown in FIG. 2, the rotary tubular element 72 co-rotating with the scanning mirror 30 is provided with an external toothing configured for meshing with the motor toothed wheel 70. Alternatively, there may be one or more interposed toothed wheel(s).

In the embodiment shown in FIG. 3, the rotary tubular element 76 co-rotating with the scanning mirror 30 is provided with an internal toothing made on a flange 78 thereof, configured for meshing with the motor toothed wheel 70. Again, there may also be one or more interposed toothed wheel(s).

In the embodiment of FIG. 4, the motion transmission coupling between the rotary tubular element 80 co-rotating with the scanning mirror 30 and the rotor 66 of the electric motor 24 is of the belt type. In particular the rotary tubular element 80 comprises an external toothing similar to the embodiment of FIG. 2, and a toothed belt 82 extends about the toothed members of the rotary tubular element 80 and of the motor 24.

Figure 5:
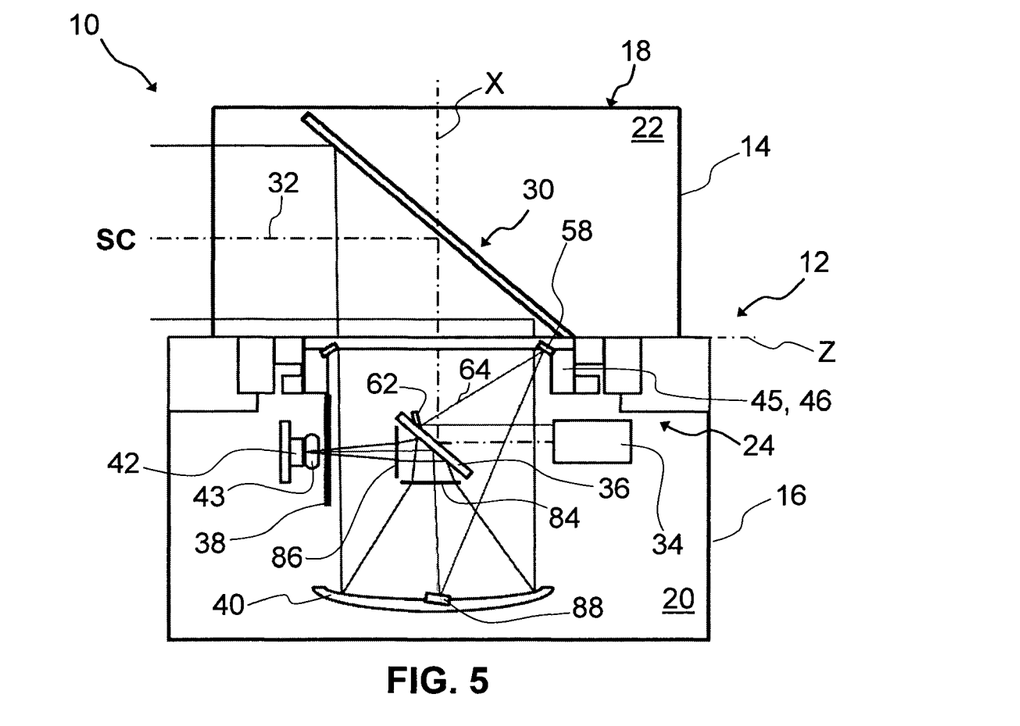

FIG. 5 shows another embodiment of a laser scanner 10 of the invention, with an alternative receiving subsystem. Also this embodiment will be described hereinafter only in what differs from the first embodiment of FIG. 1.

Instead of being positioned facing the collecting mirror 40, the photodetector element 42 is positioned aside the bending mirror 36, with its optical axis tilted by 90° with respect to the axis of rotation X. As shown in FIG. 5, in such a configuration the optical axis of the photodetector element 42 is essentially aligned with the optical axis of the light source 34, and the two components are arranged on opposed sides of the bending mirror 36. In particular, the photodetector element 42 is positioned so as to face the bending mirror 36 on a same side thereof as the collecting mirror 40.

In this embodiment, also the back face of the bending mirror 36 has suitable reflective properties. Furthermore, preferably a first relay lens 84 is placed between the collecting mirror 40 and the bending mirror 36, and/or a second relay lens 86 is placed between the bending mirror 36 and the photodetector element 42, to adjust the length and/or cross-size of the optical light collection path.

Moreover, in this embodiment the reference light collection optics comprises a second static reference deflecting mirror 88, which is preferably formed as one piece with, or at least placed at, the collecting mirror 40 as shown.

Figure 6:
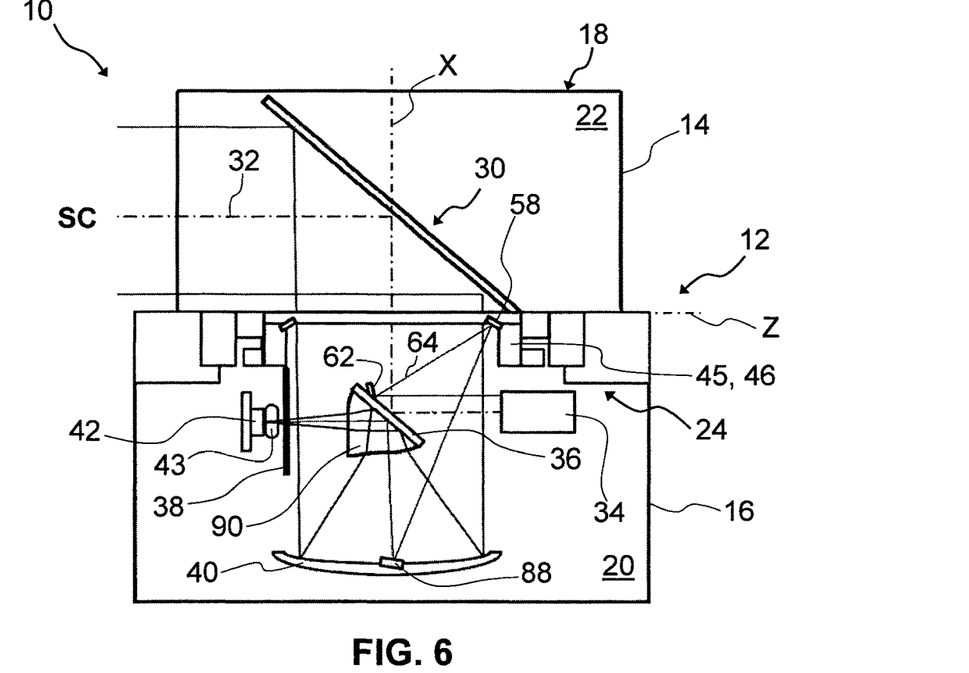

FIG. 6 shows another embodiment of a laser scanner 10 of the invention, with an alternative receiving subsystem. This embodiment will be described hereinafter only in what differs from the embodiment of FIG. 5.

In this embodiment, a single prism 90 replaces the relay lenses 84, 86.

Figure 7:
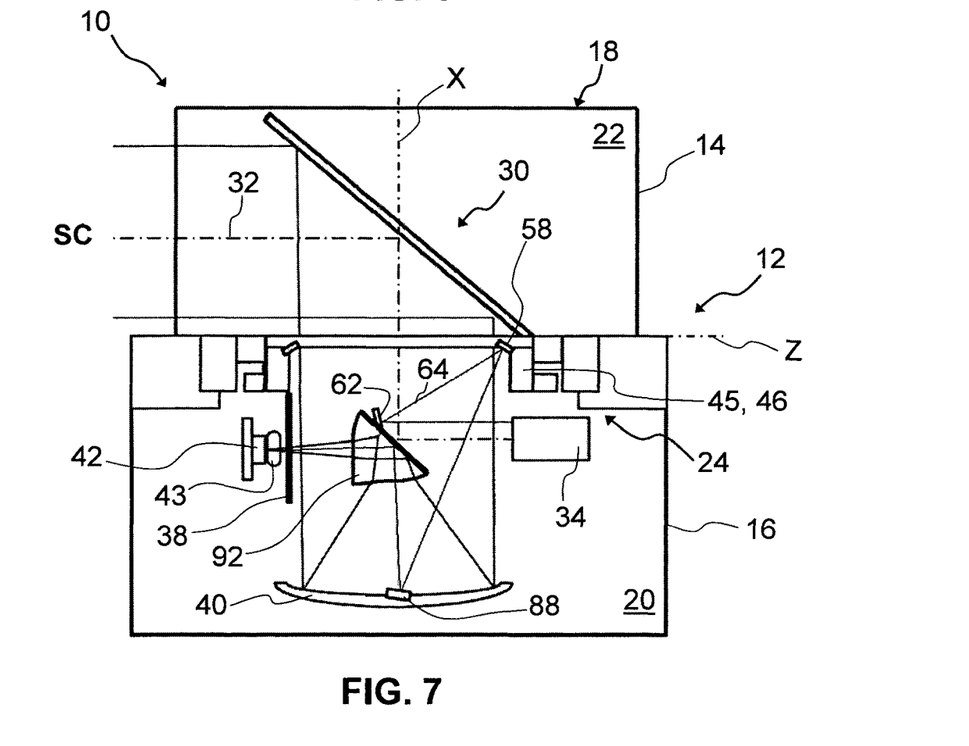

FIG. 7 shows another embodiment of a laser scanner 10 of the invention, with an alternative receiving subsystem. This embodiment will be described hereinafter only in what differs from the embodiment of FIG. 5.

In this embodiment, a single prism 92 replaces both the relay lenses 84, 86 and also the bending mirror 36.

Figure 8:
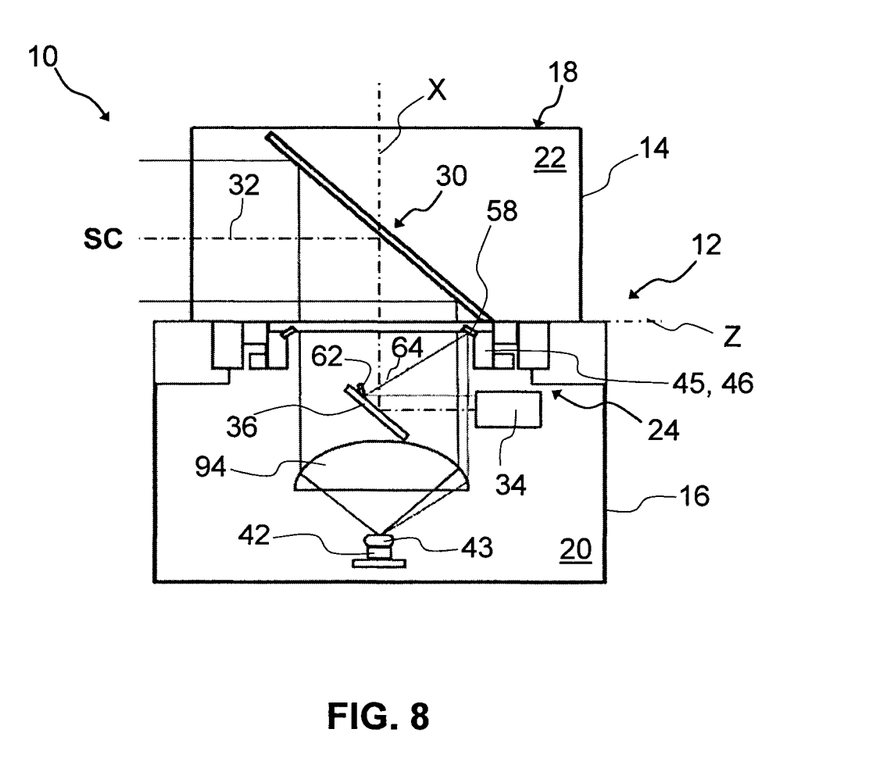

Another embodiment of a laser scanner according to the invention is shown in FIG. 8, and will be described only in what differs from the first embodiment illustrated in FIG. 1.

In the receiving section, the collecting mirror 40 is replaced by a collecting and focusing lens 94, and the photodetector element 42 is placed at the focus of the collecting and focusing lens 94.

In this case, the detecting face of the photodetector element 42 is generically oriented toward the scanning mirror 30, namely the photodetector element 42 is upside down with respect to the embodiment of FIG. 1.

A similar configuration of focusing lens 94 and photodetector element 42 arranged at its focus may also be combined with the tilted arrangement shown in any of FIGS. 5-7.

Moreover, it is understood that the variants to the transmission of the rotary motion to the scanning mirror 30 described in connection with FIGS. 2-4 may be combined with any of the variants to the receiving section described in connection with FIGS. 5-8.

Moreover, several changes, replacements and variants may be made to the disclosed embodiments, such as those detailed hereinbelow by way of a non-limiting example.

The various reflecting surfaces may be formed of plastic material, which has one or more layers of a reflective coating thereon to provide a reflective surface.

It is not necessary that the entire cap 18 of the housing 12 is transparent as shown. Instead, it suffices that a lateral surface thereof is transparent—at least in a region thereof along the direction parallel to the rotation axis X— so as to allow passage of the scanning beam and of the return light from the scanning area SC.

Moreover, it is not necessary that the cap 18 of the housing 12 has a lateral cylindrical shape as shown, although it preferably has rotational symmetry. It might have a conical shape, or have a broken generating line.

In the embodiments of FIGS. 1 and 5-8 the second portion or cap portion 14 of the housing is shown as having a smaller diameter than the first portion 16 of the housing 12, while in the embodiments of FIGS. 2-4 the two portions 14, 16 of the housing are shown to have the same diameter. Neither of the two features is essential to none of the embodiments; moreover the second portion or cap portion 14 of the housing may even have a larger diameter than the first portion 16 of the housing 12 in any embodiment. Also, the housing need not be cylindrical.

As said, the transparent plate 50 may be missing, there being simply a central hole 52 in the rotary tubular element 46, 72, 76, 80, which in such a case will be a hollow collar. It is noted in particular that electric motors having a hollow rotor are commercially available.

As said, the rotary tubular element 46, 72, 76, 80 and the scanning mirror 30 are preferably co-moulded in transparent plastic with a reflective disc glued or coated on the mirror portion.

As a person skilled in the art will understand upon reading the present disclosure, the optical paths may deviate from those shown and described above.

The deflection angle of the scanning mirror 30 has been shown as being of 45° with respect to the axis of rotation X, but this is not strictly necessary.

The deflection angles of the components of the emission optics and of the light collection optics have also been shown as being of either 0°, 45° or 90° with respect to the axis of rotation X, but different angles may be used.

The deflection angles of the first and the second static reference deflecting mirror 62, 88 and of the reference target(s) 58 with respect to the axis of rotation X may also be suitably chosen.

The reference system may be provided with its own laser source, and/or with its own photodetector element.

The above is a description of various embodiments of inventive aspects, and further changes can be made without departing from the scope of the present invention. The shape and/or size and/or location and/or orientation of the various components can be changed. The functions of a component can be carried out by two or more components and vice-versa. Components shown directly connected to or contacting each other can have intermediate structures arranged between them. The details shown in a figure and/or described with reference to a figure or to an embodiment can apply in other figures or embodiments. Not all of the details shown in a figure or described in a same context have to necessarily be present in a same embodiment. Features or aspects that turn out to be innovative with respect to the prior art, alone or in combination with other features, should be deemed to be described per se, irrespective of what is explicitly described as innovative.

The invention claimed is:

1. A laser scanner including:
    a housing having a window;
    a light source for emitting a light beam, the window being transparent to the wavelength(s) of the light beam;
    a scanning mirror rotatable about an axis of rotation (X) for deflection of the light beam toward a scanning area (SC) so that the light beam periodically sweeps a sweep surface, and for deflection of return light from objects or persons in the scanning area (SC) into a light collection path;
    a motor for rotating the scanning mirror;
    a photodetector element for generating an electric signal, arranged in the light collection path, wherein the sweep surface is a sweep plane and the motor, the light source, and the photodetector element are all housed within the housing on a same side of the sweep plane, the same side being a same half-plane with respect to the at least one sweep plane; and
    a reference subsystem comprising at least one reference target that when illuminated by a reference light beam returns reference return light over a reference light collection path to a reference photodetector, wherein the at least one reference target is different from, but co-rotates with, the scanning mirror so as to be periodically illuminated by the reference light beam.

2. The laser scanner according to claim 1, further including emission optics upstream of the scanning mirror in the emission path of the light beam from the laser source to the scanning mirror.

3. The laser scanner according to claim 2, wherein the emission optics is arranged closer to the scanning mirror than the photodetector element.

4. The laser scanner according to claim 2, further including light collection optics in the light collection path, wherein the light collection optics comprises at least one wavelength selective element.

5. The laser scanner according to claim 2, further including light collection optics in the light collection path, wherein the light collection optics comprises a collecting mirror, and wherein the photodetector element is arranged closer to the scanning mirror along the rotation axis (X) than the collecting mirror, and has its detecting face facing away from the scanning mirror and toward the collecting mirror.

6. The laser scanner according to claim 2, further including light collection optics in the light collection path, and wherein the light emission optics comprises at least one bending mirror or prism in the emission path.

7. The laser scanner according to claim 6, wherein the light collection optics comprises a bending or folding mirror made on a face opposite the bending or folding mirror of the emission optics, the photodetector element being not coaxial with the rotation axis (X).

8. The laser scanner according to claim 1, wherein the scanning mirror co-rotates with a rotary tubular element part of or driven into rotation by the motor, the rotary tubular element having a light transmissive radially central portion, and wherein at least a portion of the light collection path and/or at least a portion of the emission path from the light source to the scanning mirror passes through the light transmissive radially central portion of the rotary tubular element.

9. The laser scanner according to claim 8, wherein the rotary tubular element is a rotor of the motor, being supported to the housing through at least one bearing, coaxially inner with respect to a stator of the motor.

10. The laser scanner according to claim 8, wherein the rotary tubular element is driven into rotation by a rotor of the motor through a motion transmission coupling, and wherein the motion transmission coupling comprises an external toothed member of the rotary tubular element meshing with an external toothed member of the rotor.

11. The laser scanner according to claim 8, wherein the rotary tubular element is driven into rotation by a rotor of the motor through a motion transmission coupling, and wherein the motion transmission coupling comprises an internal toothing of the rotary tubular element meshing with an external toothing of the rotor.

12. The laser scanner according to claim 8, wherein the at least one reference target comprises more than one reference target, the remittance of the reference targets and/or their spacing about the rotation axis (X) encoding an angular position of the scanning mirror and/or an angular speed of the scanning mirror.

13. The laser scanner according to claim 12, wherein each of the at least one reference target extends along a sector of a radially inner surface of the rotary tubular element co-rotating with the scanning mirror.

14. The laser scanner according to claim 1, wherein the scanning mirror co-rotates with a rotary tubular element part of or driven into rotation by the motor, the rotary tubular element having a light transmissive radially central portion, and wherein the light transmissive radially central portion of the rotary tubular element comprises a hole and/or a transparent plate.

15. The laser scanner according to claim 1, wherein the reference light source is the light source and the reference light beam is a reference portion of the light beam, wherein the reference portion is a non-central portion of the light beam that is offset with respect to an axis of the light beam.

16. The laser scanner according to claim 1, wherein the reference subsystem further comprises at least one of reference emission optics or reference light collection optics.

17. The laser scanner according to claim 1, wherein the reference emission path is not coinciding with the emission path from the light source to the scanning mirror.

18. The laser scanner according to claim 1, wherein the reference light collection path is not coinciding with the light collection path.

19. The laser scanner according to claim 1, wherein the scanning mirror is not involved in any of the reference emission path and the reference light collection path.

20. The laser scanner of claim 1, wherein the sweep plane is orthogonal to the rotation axis (X) of the scanning mirror.

21. The laser scanner of claim 1, wherein the reference return light is received for 360° range of scanning.

22. The laser scanner of claim 1, wherein the housing includes:
a first housing portion formed from an opaque material with an interior chamber that houses the light source the motor, the photodetector element, and the reference subsystem; and
a second housing portion formed from a transparent cap that forms the window and that includes an interior chamber that houses the scanning mirror.

* * * * *